United States Patent [19]
Rice et al.

[11] 3,886,288
[45] May 27, 1975

[54] CHEESE MANUFACTURE USING HIGHLY ACTIVE PROTEOLYTIC ENZYMES

[75] Inventors: Eldon E. Rice, Palos Park, Ill.; Oreste J. Lantero, Jr., North Fargo, N. Dak.

[73] Assignee: Swift and Company, Chicago, Ill.

[22] Filed: June 15, 1970

[21] Appl. No.: 46,536

[52] U.S. Cl. .................. 426/36; 426/40; 426/42; 426/43
[51] Int. Cl. ............................................. A23c 19/02
[58] Field of Search ............ 99/116; 426/36, 40, 42, 426/43

[56] References Cited
UNITED STATES PATENTS

| | | | |
|---|---|---|---|
| 2,851,363 | 9/1958 | Kielsmeiet | 99/116 |
| 2,900,257 | 8/1959 | Roundy | 99/116 |
| 2,982,654 | 5/1961 | Hammond et al. | 99/116 |
| 3,172,767 | 3/1965 | Foster, Jr. et al. | 99/116 |

OTHER PUBLICATIONS

Ilany, et al., Milk–Clotting Activity of Proteolytic Enzymes, J. Dairy Science, Vol. 52, No. 1, 1/1969, (pp. 43–46), SF221.58.

*Primary Examiner*—David M. Neff
*Attorney, Agent, or Firm*—Edward T. McCabe; Charles E. Bouton; W. C. Davis

[57] ABSTRACT

An improved method for preparing a high quality cheese curd utilizing highly active proteolytic enzymes which produce an unstable coagulum if used in conventional methods of cheese making. The highly active proteolytic enzyme is added to milk and is inactivated after the protein casein has been altered sufficiently to produce a stable coagulum but before excessive hydrolysis occurs. Then a bacterial culture is incorporated therein to promote a desirable flavor and texture. Thereafter, the mixture is coagulated and the coagulum is processed in the conventional manner of preparing a finished high quality cheese product.

10 Claims, No Drawings

CHEESE MANUFACTURE USING HIGHLY ACTIVE PROTEOLYTIC ENZYMES

This invention relates to the manufacture of cheese and, more particularly, pertains to an improved process for the manufacture of high quality cheese curd using highly active proteolytic enzymes which, if used in conventional cheese making processes, would produce an unstable coagulum.

Conventionally, cheese curd is produced by somewhat time-consuming and laborious methods. Generally, a bacterial starter culture is first added to a vat of milk and the mixture is heated and held at a suitable temperature for a period of time to promote ripening. The length of time required to promote the ripening depends upon the concentration and activity of the culture, the holding temperature, the characteristics of the milk itself, e.g., the pH and fat content, and other factors. Following the ripening the enzyme rennet is added to form a coagulum comprising curd and whey. The coagulum mass is then cut into small cubes and the temperature is raised to assist the separation of the whey from the curd. After about 2 ½ hours from the addition of the rennet, during which time acid is produced by the bacterial starter action, the whey is drawn off from the vat. The cubed curd is allowed to mat and is then cut into bricks and stored in various ways known in the art for curing and aging to promote good flavor and texture development. The conditions of this generally-described conventional method may be varied greatly to produce many different types of cheese curd.

Additional steps and conditions have also been practiced to reduce the time required to form a coagulum in cheese manufacture. One such step is the direct addition of food acid to the rennet-milk mixture under certain conditions. The added acid produces an almost immediate formation of a coagulum which reduces the time normally required as when only a culture and rennet are incorporated therein. It appears that the added acid increases the solubility of bivalent alkaline earth metal ions in the mixture which precipitate the milk protein to form the coagulum.

It has been observed that, in the above-described methods of cheese curd manufacture, the enzyme rennet alters the milk protein casein to paracasein. Soluble calcium (and magnesium) salts present in the milk then precipitate the paracasein, thereby forming insoluble calcium (and magnesium) salts of the altered casein commonly known as curd. The acid produced by the action of the bacterial starter and the acid added by the cheese-making step described above aid in solubilizing the calcium (and magnesium) so that it will readily precipitate the paracasein. Additionally, the continual incubation of the added culture promotes distinct flavors and textures in the cheese curd during later curing and aging processes.

Several proteolytic enzymes of different origin have also been substituted for rennet in the manufacture of cheese curd. For example, enzymes of animal origin, such as trypsin, pepsin, and pancreatin; enzymes of plant origin, such as bromelain, ficin, and papain; enzymes of mold origin; those derived from bacterial organisms; and mixtures thereof have been incorporated into cheese curd manufacture methods as aids to coagulum formation.

However, the substitution of certain of these enzymes (ones that exhibit high proteolytic activity) for rennet in conventional commercial methods of cheese manufacture, has usually been unsatisfactory to produce a high quality cheese curd with high yield and organoleptic scores. It is generally recognized that these highly active proteolytic enzymes exhibit more proteolytic activity than the enzyme rennet, and it has been our experience that such enzymes, when added to milk in otherwise conventional methods of cheese curd manufacture, produce an unstable coagulum thereby preventing the formation of a strong curd. This is believed to be due to an excessive proteolytic hydrolysis or digestion of the protein casein by the added highly active enzyme. We have found that a high quality cheese curd can be produced through the use of highly active proteolytic enzymes to alter casein by carefully controlling the enzyme proteolysis. We have found that this may be accomplished by inactivating the enzyme after a sufficient period of time has passed to alter the casein but prior to the time excessive hydrolysis begins. Several enzyme inactivating systems have been generally recognized, for example, a heat system or an hydrogen peroxide-catalase system, but such systems have not heretofore been incorporated into conventional methods of manufacturing high quality cheese for it has been found that the systems produce the disadvantages of altering the final flavor and/or destroying bacterial cultures added to increase flavor and texture development upon aging and curing of high quality cheeses.

Therefore, it is an object of the present invention to provide an improved process for the manufacture of a high quality cheese curd which incorporates the utilization of highly active proteolytic enzymes that would cause an uncontrollable hydrolysis of the milk protein casein if used in conventional cheese making processes.

An additional object of our invention is to provide an improved method for the use of highly active proteolytic enzymes that usually produce an unstable coagulum in high quality cheese manufacture wherein the flavor and texture development produced by a later added bacterial culture is not affected.

Another object of our invention is to present an improved method of high quality cheese manufacture utilizing highly active proteolytic enzymes wherein said enzymes are inactivated with an inactivating system without destroying a later added bacterial culture.

A further object is to provide an improved method for the manufacture of cheese for utilizing a bacterial starter culture that develops flavor and texture during aging and curing to produce a high quality cheese.

Other objects and advantages of the present invention if not specifically set forth herein, will be readily apparent to those skilled in the art from a reading of the following description of the invention.

In the practice of our invention, it is now possible to substitute highly active proteolytic enzymes which produce an unstable coagulum by conventional processes, for rennet to alter the casein and still obtain a stable coagulum with good strength and particle size suitable for high quality cheese manufacture. Also, it is possible to add a bacterial starter that will continue to develop a flavor and texture during the aging and curing of the cheese curd without interference, by following the critical sequence of steps.

Generally, the present invention is an improved method for cheese curd manufacture comprising the steps of first altering the milk protein casein with a highly active proteolytic enzyme; inactivating the enzyme before excessive hydrolysis occurs; then adding a bacterial culture and finally coagulating the mixture. The curd is separated from the whey of the coagulum and sliced, matted, etc. as in conventional methods of cheese manufacture. The milk to be used in the process can be either heat treated, or not, and may be pasteurized, or not. If it is desirable to consider the cheese curd as pasteurized, the milk must be heated to a range of about 140°–190°F. for a sufficient period of time to produce a negative phosphatase test. This pasteurizing step need not take place at any specific point in the process, i.e., we may start out with whole untreated milk.

In practicing our invention we have found that it is desirable to heat the milk to a range of about 80° to 180° F. We prefer to warm the milk to about 80° to 130° F. for temperatures in this range appear to produce a better curd yield.

A highly active proteolytic enzyme is then added to the milk. The highly active proteolytic enzyme contemplated for employment in the present invention can be defined as one that causes excessive hydrolysis of the milk protein casein if uncontrolled. Highly active enzymes of animal origin, plant origin, mold origin and those derived from the overall culture of bacterial organisms are suitable for employment in the instant method. We prefer to alter the milk protein by adding a plant-derived proteolytic enzyme, for example, bromelain, papain, ficin and mixtures thereof. These plant-derived enzymes have been observed to be highly active and are believed to be generally undesirable for utilization in conventional commercial cheese-making processes due to high proteolytic activity. Accordingly, these plant-derived enzymes are relatively cheap and are readily available in commercial preparations.

Each of the highly active proteolytic enzymes varies in its ability to alter the protein casein in differing concentrations and in differing lengths of time. According to the present invention, the enzyme must be allowed to act on the milk protein casein for a sufficient time to alter the casein to paracasein but not for such a period of time that excessive hydrolysis occurs thereby preventing the formation of a stable coagulum.

In actual practice of the present invention, it may be desirable to carefully follow the enzyme activity to specifically determine when the casein has been sufficiently altered. Tests have shown that neither the desired alteration of the casein which permits proper coagulation nor the excessive hydrolysis which prevents the formation of a stable coagulum can be observed visually. However, the extent of protein change can be followed with an appropriate test, for instance, at time zero the enzyme can be added to the milk and at specific time intervals therefrom an aliquot of milk can be removed. Immediately upon removal, calcium chloride is added to the aliquot to determine if the milk will clot. When one of the aliquots clots immediately, the casein has been altered sufficiently and the enzyme should be inactivated as soon as possible.

If the curd is to be prepared batchwise, we prefer to add the highly active proteolytic enzyme in an amount to sufficiently alter the casein to paracasein in about 10 to 30 minutes. It has been observed that the reaction is too fast to be convenient and under control in batch processing if the enzyme is added in an amount which will alter the casein in less than 10 minutes. Also, it is undesirable to add the enzyme in an amount such that alteration takes longer than 30 minutes, for plant equipment is tied up and frequently the curd quality appears to be inferior.

Crude enzyme preparations vary in potency from lot to lot, but we have found that about 2 to 40 mg. of crude highly active proteolytic enzyme per liter of milk can be added to alter the casein within the preferred 10 to 30 minutes for batch processing. This range appears to cover most commercial enzyme powders and conditions used in cheese making.

However, if the curd is to be prepared continuously, the highly active proteolytic enzyme is added to a continuous stream of milk in precisely controlled amounts to sufficiently alter the casein to paracasein in a much shorter reaction time. The amount of enzyme required can only be determined empirically.

After the highly active proteolytic enzyme has been in contact with the milk for a sufficient time to alter the casein, it is then inactivated and/or destroyed by an enzyme inactivating system to prevent any further proteolytic hydrolysis. Several enzyme-inactivating systems are known in the art, such as heat. Another well-known one is a hydrogen peroxidecatalase treatment. The latter is preferred in the practice of our invention, for the amount of heat required to inactivate and/or destroy the enzyme activity appears to alter the flavor characteristic of high quality finished cheese curd. A hydrogen peroxide-catalase system destroys the activity of the enzyme and leaves no effect upon flavor or texture development of the cheese curd. The amount of hydrogen peroxide to be added should be an amount sufficient for complete inactivation by oxidizing the enzyme present. We prefer to add an excess of hydrogen peroxide to insure total enzyme inactivation. It has been determined that a preferred amount of enzyme in the milk mixture can be totally inactivated by the addition of about 10 to 20 ml. of 3% hydrogen peroxide solution per liter of milk.

Any excess hydrogen peroxide remaining after an optimum deactivating time of about 2 to 10 minutes can be removed by incorporating a solution of commercial catalase into the mixture. It is most important in the practice of the present invention to remove all excess hydrogen peroxide from the mixture, for if any remains it will destroy any subsequently added bacterial culture resulting in a loss of flavor and texture development of a high quality finished cheese curd. A commercial catalase preparation, for example, beef liver catalase or fungal catalase, is preferably used. We have observed that the addition of about 2 to 5 ml. of commercial catalase for each 100 ml. of 3% hydrogen peroxide used will remove any excess hydrogen peroxide. Also, it is desirable to allow the catalase to decompose the hydrogen peroxide for approximately 10 to 35 minutes to insure complete removal.

The generally recognized function of a bacterial starter culture in a cheese manufacture process is to produce acid to aid in the formation of a coagulum and to promote distinct flavor and texture development of the cheese curd during later aging and curing processes. The present invention specifically contemplates the addition of a culture, for it is believed that cheeses cured and aged with bacterial starters incorporated therein are of a higher quality. Any commercial cheese starter culture can be employed, for example, the organisms of *Streptococcus thermophilus, Lactobacillus bulgaricus, Streptococcus durans, Streptococcus, faecalis* and others. A particularly suitable culture includes the organisms of the *Streptococcus lactis* and related types. It is most critical to add the starter culture after the casein has been altered, the enzyme has been totally inactivated and the hydrogen peroxide inactivator has been totally removed, for any hydrogen peroxide remaining will instantly destroy the subsequently added organisms as described hereinbefore. The amount of culture added is dependent upon the type used and the type of flavor and texture development that is desired of the finished curd. The preferred volume of single strength culture to be added is about 0.1 to 5% of the milk. Also, we prefer to allow the culture to incubate until it is growing well which usually occurs in about 50–65 minutes when the temperature of the mixture is held at around 80° to 96° F.

After it has been determined that the starter culture is growing well, a coagulum is formed by precipitating or coagulating the paracasein preferably by additional acidulation or incorporating additional soluble calcium ions into the mixture. The coagulum will form by the acid produced by the starter culture without the addition of one of these coagulating adjuncts, but the procedure is quite slow and therefore not preferred. It appears the pH of the milk bears a direct relation to the formation of the coagulum, and we have observed that precipitation occurs almost immediately when the pH of the mixture is lowered to between about pH 5 to pH 6.3. The acidulation can be accomplished by the addition of any food acid such as lactic acid, acetic acid, citric acid, etc. In respect to the amount of acid used, it will be readily apparent that the amount of acid required is dependent upon the pH that is desired to promote coagulation in a given time period and upon the type of milk initially used.

If desired, coagulation of the enzyme-treated milk-culture mixture can be accomplished by acidulation from ester hydrolysis. For example, the ester D-glucono-delta-lactone can be employed. The ester, when incorporated into the mixture, appears to slowly hydrolyze to produce the acid form of the compound which lowers the pH of the enzyme-treated milk-culture mixture sufficiently to form a coagulum. We have observed that approximately 8–12 grams of D-glucono-delta-lactone added per liter of milk will form a coagulum in about 10 to 30 minutes.

It may also be desirable to precipitate the mixture by furnishing additional soluble calcium ions and thus strengthen the curd formed. We have observed that a firm coagulum is formed when we add a soluble calcium salt, such as calcium chloride or calcium gluconate, to the mixture. When desired, calcium chloride can be added in an amount of about 1.0 to 3.0 grams per liter of milk. If calcium gluconate is to be added, it is preferable to add approximately 6–10 grams per liter of milk to the mixture. Tests have shown that we can vary the time of curd formation by the utilization of differing concentrations of these soluble calcium salts. That is to say, we have observed that we can produce an almost immediate precipitation of the paracasein resulting in a strengthened curd formation by employing increased amounts of a soluble calcium salt or delay the curd formation by utilizing lesser amounts.

It will be understood that the formation of the coagulum can be accomplished by either the addition of a food acid, addition of a soluble calcium salt, acidulation from ester hydrolysis, the allowance of the starter culture to develop the necessary acid, or a mixture of any of these steps as can be observed in the examples set forth hereafter which illustrate our preferred conditions.

EXAMPLE I

A 100 milliliter quantity of 5% ficin solution was added to 54 gallons of milk that had been adjusted to 88° F., the temperature normally used with rennin. The enzyme was inactivated 13 minutes later by adding 1,970 milliliters of a 3% hydrogen peroxide solution. The excess hydrogen peroxide was destroyed by adding 90 milliliters of beef liver catalase 10 minutes after the peroxide addition. The treated milk was held for 35 minutes, to make sure all the residual peroxide was destroyed. Then, a 5 pound quantity of culture was added. It was determined that the culture was growing well 65 minutes later and a 990 milliliter quantity of 44% calcium chloride solution was added, causing immediate clotting. The curd was handled in the normal fashion by cutting, cooking, cheddaring, salting and finally pressing. A well formed fresh cheese resulted.

EXAMPLE II

A 100 ml. quantity of a 6% papain solution diluted to 2,000 ml. with cold tap water was added to 54 gallons of milk that had been adjusted to 85° F. The enzyme was inactivated 15 minutes later by adding 2,000 of a 3% hydrogen peroxide solution, then ml. 10 minutes after the peroxide addition an 80 ml. quantity of beef liver catalase solution diluted to 1,000 ml. with cold tap water was added, destroying the excess peroxide. The milk was stirred rather vigorously for 10 minutes, after which a 4.6 pound quantity of lactic starter culture was added. After 50 minutes of incubation at 85° F. the culture was growing well, at which time the pH of the milk was lowered from 6.6 to 5.5 with a 10% solution of lactic acid which caused immediate coagulation. Precipitation of the milk protein was observed when the pH of the enzyme treated milk was below 6.0. After coagulation the curd was handled in the normal method of preparing cheddar cheese.

EXAMPLE III

A 25 ml. quantity of a 1% bromelain solution was added to 2 gallons of milk at a temperature of 80° F. The enzyme was deactivated by adding 75 ml. of a 3% hydrogen peroxide solution 20 minutes after the enzyme addition. The excess peroxide was destroyed 15 minutes later by introducing a 3 ml. quantity of beef liver catalase diluted to 100 ml. with cold distilled water. The temperature was raised to 88° F. during the 20 minute holding time period for the destruction of excess peroxide by catalase. Then the enzyme treated milk was inoculated with a 119 gram quantity of lactic starter culture. The necessary titratable acidity was developed in the milk by the culture 60 minutes after the inoculation. Then a mixture of 38 grams of calcium gluconate and 38 grams of glucono-deltalactone was added causing coagulation 10 minutes later. As in the other examples the coagulum was handled in the fashion for making cheddar cheese.

EXAMPLE IV

A solution containing 12 ml. of a 1% bromelain solution and 16 ml. of a 1% ficin solution was added to 8 liters of milk held at a temperature of 88° F. The enzyme reaction was continued for 15 minutes after which 160 ml. quantity of a 3% hydrogen peroxide solution was added to oxidize the sulfhydryl enzymes to the inactive state. The excess hydrogen peroxide was then destroyed by adding 5 ml. of a 0.1% fungal catalase solution. After a 20 minute holding period an 80 gram quantity of lactic starter culture was added. The necessary titratable acidity indicating good culture growth was observed 60 minutes after inoculation at which time a 64 gram quantity of calcium gluconate was added resulting in curd formation 15 minutes later. Again the curd was handled as in the other examples.

EXAMPLE V

A solution containing 12 ml. of a 1% papain solution and 12 ml. of a 1% ficin solution was added to 8 liters of milk at a temperature of 88° F. The time period of enzyme reaction and quantities of hydrogen peroxide and fungal catalase and also the level of culture were the same as in Example IV. However, 60 minutes after inoculation an 80 gram quantity of gluconadeltalactone (GDL) was added resulting in curd formations 16 minutes later. The curd was then handled as in the other examples.

Obviously many modifications and variations of the invention as hereinbefore set forth may be made without departing from the spirit and scope thereof, and, therefore, only such limitations should be imposed as are indicated in the appended claims.

We claim:

1. An improved method for producing a high quality cheese curd having a viable bacterial culture incorporated therein for flavor and texture development utilizing highly active proteolytic enzymes, said method comprising: adding a highly active plant-derived proteolytic enzyme to milk in an amount of about 2 to 40 mgs. per liter of milk, the enzyme being characterized as producing an unstable coagulum when uncontrolled and being one selected from the group consisting of bromelain, papain, ficin and mixtures thereof; totally inactivating said enzyme after a sufficient period of time to alter the protein casein of said milk to paracasein but insufficient to produce excessive hydrolysis of said casein; then adding a bacterial culture after the enzyme has been totally inactivated; and thereafter coagulating the altered casein, said coagulation being characterized by the formation of a stable coagulum with a viable bacterial culture incorporated therein.

2. The method of claim 1 wherein milk is first heated to a temperature of about 80° to 130° F. prior to the addition of said enzyme.

3. The method of claim 1 wherein said enzyme is inactivated within approximately 10–30 minutes after having been added to said milk.

4. The method of claim 1 wherein said highly active proteolytic enzyme is inactivated by adding hydrogen peroxide, the hydrogen peroxide being added in an amount to totally inactivate all enzyme proteolytic activity, and subsequently adding catalase, the catalase being added in a sufficient amount to remove all excess hydrogen peroxide.

5. A method of claim 4 wherein said hydrogen peroxide is added in an amount of about 10 to 20 ml. of 3% hydrogen peroxide per liter of milk and said catalase is commercial catalase being added in an amount of about 2 to 5 ml. per 100 ml. of 3% hydrogen peroxide utilized.

6. The method of claim 1 wherein said added bacterial culture is allowed to incubate for about 50–65 minutes before said coagulation step.

7. A method as set forth in claim 1 wherein said coagulating step is performed by adding a food grade acid, said acid being added in an amount to adjust the pH of the mixture to approximately pH 5.0 to 6.3.

8. A method as set forth in claim 1 wherein said coagulating step is carried out by adding about 8–12 grams per liter of milk of D-glucono-delta-lactone to said milk mixture.

9. A method as set forth in claim 1 wherein said altered casein is coagulated by incorporating additional soluble calcium ions into the mixture, said calcium ions being in the form of a soluble calcium salt.

10. An improved method for producing a high quality cheese curd utilizing highly active proteolytic enzymes comprising: heating milk to a temperature of between 80° to 130° F.; adding a highly active proteolytic enzyme in an amount of about 2 to 40 mgs. per liter of milk, said enzyme being selected from the group consisting of bromelain, papain and ficin; inactivating said enzyme after the milk protein casein has been altered sufficiently to produce a stable coagulum but before excessive hydrolysis occurs, said inactivation being performed by the addition of hydrogen peroxide in an amount to totally inactivate all enzyme activity; removing all excess hydrogen peroxide remaining in the mixture, said hydrogen peroxide being removed by incorporating a sufficient amount of commercial catalase into the mixture; then adding a bacterial culture to the mixture; and thereafter coagulating the altered casein, said coagulation being characterized by the formation of a stable coagulum.

* * * * *